(12) United States Patent
Natori (10) Patent No.: US 9,298,522 B2
(45) Date of Patent: Mar. 29, 2016

(54) METHOD OF DATA COMMUNICATION BETWEEN APPLICATION PROGRAM AND PRINTER DRIVER, AND PROGRAM THEREFOR

(75) Inventor: Hideo Natori, Hino (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 1115 days.

(21) Appl. No.: 12/620,937

(22) Filed: Nov. 18, 2009

(65) Prior Publication Data

US 2010/0149586 A1 Jun. 17, 2010

(30) Foreign Application Priority Data

Dec. 11, 2008 (JP) ................................ 2008-316274

(51) Int. Cl.
*G06F 9/54* (2006.01)
*G06F 3/12* (2006.01)

(52) U.S. Cl.
CPC .............. *G06F 9/544* (2013.01); *G06F 3/1204* (2013.01); *G06F 3/1224* (2013.01); *G06F 3/1284* (2013.01)

(58) Field of Classification Search
None
See application file for complete search history.

(56) References Cited

U.S. PATENT DOCUMENTS

| 5,867,633 | A | | 2/1999 | Taylor, III et al. ............. 395/109 |
| 5,898,422 | A | * | 4/1999 | Zetts .............................. 715/856 |
| 5,964,843 | A | * | 10/1999 | Eisler et al. .................... 719/323 |
| 6,367,036 | B1 | * | 4/2002 | Hansen ................. G06F 11/348 710/310 |
| 7,434,233 | B2 | | 10/2008 | Kotani ........................... 719/329 |
| 2006/0197968 | A1 | * | 9/2006 | VanNostrand ............... 358/1.13 |
| 2007/0013926 | A1 | * | 1/2007 | Miyata ............................ 358/1.9 |
| 2007/0024874 | A1 | * | 2/2007 | Kawamura ...................... 358/1.2 |

FOREIGN PATENT DOCUMENTS

| JP | 10-248014 A | 9/1998 |
| JP | 2004-288013 A | 10/2004 |
| JP | 2005-050307 A | 2/2005 |
| JP | 2005-258712 A | 9/2005 |

* cited by examiner

*Primary Examiner* — Mohammad Ghayour
*Assistant Examiner* — Lennin Rodriguezgonzalez
(74) *Attorney, Agent, or Firm* — Fitzpatrick, Cella, Harper & Scinto (57) ABSTRACT

An information processing apparatus and method. The apparatus comprises a generation unit configured to generate a named shared memory that can be accessed by both an application which runs with a first bit number and a printer driver which runs with a second bit number different from the first bit number. A storing unit is configured to store information in the named shared memory generated by the generation unit, and an acquisition unit is configured to acquire the information stored by the storing unit from the named shared memory generated by the generation unit. The storing unit is executed by the printer driver, and the acquisition unit is executed by the application.

25 Claims, 10 Drawing Sheets

METHOD OF DATA COMMUNICATION BETWEEN APPLICATION PROGRAM AND PRINTER DRIVER, AND PROGRAM THEREFOR

BACKGROUND OF THE INVENTION

1. Field of the Invention

The present invention relates to a method and program for communication of data between an application program, which calls an API (Application Programming Interface) supplied by an operating system, and a printer driver called by the operating system.

2. Description of the Related Art

An application program for printing acquires various printing-related information via an API generally provided by an operating system ("OS" below) and notifies of print settings.

The application program calls the function of the OS-provided API in order to acquire the capabilities of the printer. The OS queries a printer driver regarding the capabilities of the printer and returns the acquired capabilities information to the application program. The application program utilizes the returned printer capabilities information to decide the print settings used when printing is performed. The application program then calls the OS-provided API to thereby notify the OS and printer driver of the print settings.

By way of example, the type of paper that can be handled depends upon printer capabilities. Accordingly, the application program acquires a list of paper types that can be handled by the printer performing the printing. The types of paper usable in printing are designated by the user or application program. In a case where the user is allowed to make the designation, the application program displays the acquired list of paper types on a display screen and the user is allowed to select the type of paper used in printing. A collection of selected values of setting items selected by the user in order to be used at the time of printing is referred to as the print settings. The OS or printer driver can be notified of these print settings in response to the application program calling the API provided by the OS. In addition to type of paper, other examples of ordinary setting items that can be mentioned are paper size and method of feed, double-sided printing, printing orientation and number of copies, etc.

In the case of the Windows (registered trademark) operating system from Microsoft, information relating to ordinary setting items such as the type of paper that can be handled by a printer can be acquired via an API referred to as a "Device-Capabilities function". By calling the function for every information category of setting item as in a list of paper type IDs, the application program can acquire a list of setting values on a per-category basis. Further, the information concerning the print settings used in printing can be reported from the application program to the OS or printer driver by calling an API referred to as a "Create DC function" or "Reset DC function".

On the other hand, information relating to printer-specific features often cannot be acquired with a default API function provided by the OS. For example, with borderless printing used frequently in the printing of photographs, the amount of protrusion or "extension" beyond the size of the paper generally can be designated because it is required that the image be printed in an area larger than the paper size. The reason for this is an assumption that the user may set the paper in the printer in a skewed manner or that the paper will become skewed during its transport through the printer even if the paper has been set correctly. Accordingly, the set value of amount of extension in borderless printing differs depending upon the printer and although there are printers that enable the amount of extension to be set to large, medium and small values, there are also printers that only allow the amount of extension to be set to a small value. Information that cannot be acquired with an OS-provided default API function as in the manner of amount of extension in borderless printing will be referred to below as "vender-specific information".

In order that an application program may acquire vendor-specific information in Windows, there is a method of utilizing a vendor-specific API provided by a module of the printer driver. There is also a method in which the application program acquires vendor-specific information from a printer driver by utilizing an API referred to as an "ExtEscape function" provided by the OS.

A method of utilizing a vendor-specific API will be described first. The vendor-specific API is provided by a module constituting the printer driver. There are instances where the module is referred to as a "printer-driver SDK module". The application program first specifies the printer-driver SDK module. Next, the application program calls a LoadLibrary function, thereby loading the printer-driver SDK module into the address space of the process of the application program. The application program then calls the function of the vendor-specific API, which is provided by the printer-driver SDK module, whereby it can acquire the vendor-specific information (e.g., see the specification of Japanese Patent Laid-Open No. 2004-288013).

A method using the ExtEscape function will be described next. The ExtEscape function is an API provided by the OS and is used in order to transfer unique data between an application program and a printer driver. For example, the ExtEscape function is used when the application program determines whether the printer driver is equipped with an interface for executing its own image processing (e.g., see the specification of Japanese Patent Laid-Open No. 10-248014).

Since there are printers of many types and capabilities differ from one type to another, a printer driver is required for every type of OS. In the case of Windows, a large number of printer drivers are bundled with the OS product. Even if a printer driver is not bundled with the OS product, the OS is designed so that the appropriate printer driver is downloaded from Microsoft automatically via a network. Thus, with Windows, an environment is provided in which a large variety of printers print. Windows includes both a 32-bit version of the OS and a 64-bit version of the OS. Since a printer driver operates in close relation with the OS, a printer driver bundled with the 32-bit Windows product is a 32-bit printer driver and a printer driver bundled with the 64-bit Windows product is a 64-bit printer driver. The same holds true of printer drivers downloaded automatically. A 64-bit printer driver is downloaded in the case of the 64-bit version of the OS, and a 32-bit printer driver is downloaded in the case of the 32-bit version of the OS.

Further, there are two types of printer drivers that operate with Windows, namely a GDI printer driver and an XPS printer driver. GDI stands for "Graphics Device Interface". This is a program, supplied by Windows, for allowing the application program to instruct graphic rendering that is independent of the output device. A characterizing feature of the GDI driver is that a rendering module of the printer driver interprets the rendering instruction of the application program implemented via the GDI and executes print processing.

On the other hand, one of the features of an XPS printer driver which can be mentioned is that the format of device-independent print data stored in a spool file is the XPS format. XPS stands for XML Paper Specification and is one open-standard electronic document format provided by Microsoft.

The rendering instruction of the application program implemented via GDI is stored in a spool file upon being converted to XPS by an MXDC (Microsoft XPS Document Converter) provided by Microsoft. A rendering filter of the XPS printer driver interprets the XPS so that printing is executed. Here the MXDC of the XPS printer driver corresponds to the rendering module of the GDI printer driver.

Figure 2:
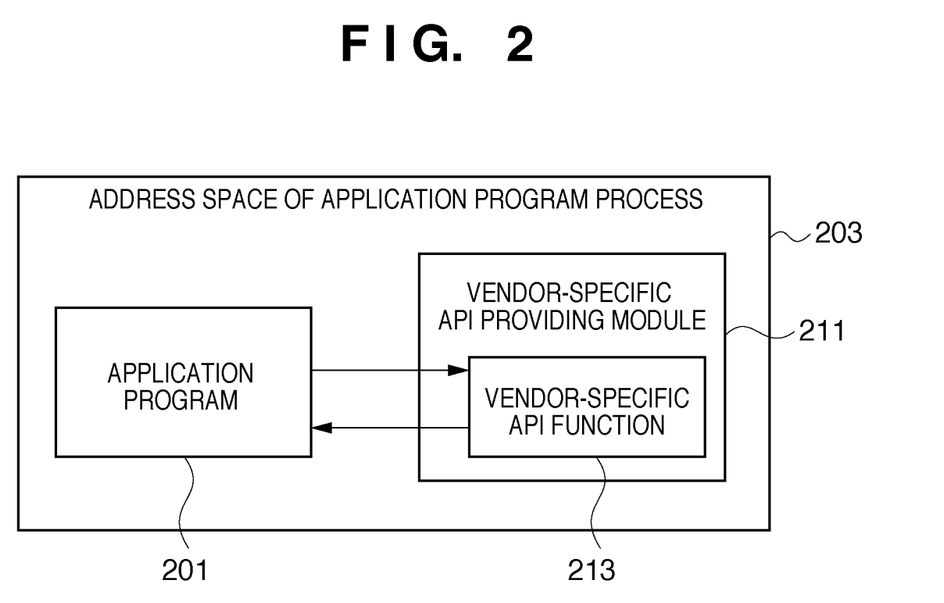
FIG. 2 is a schematic view illustrating the relationship between an application program and a printer driver in a method utilizing a vender-specific API.

FIG. 2 is an example of a schematic view illustrating the relationship between an application program 201 and a printer driver in a method utilizing a vender-specific API. In a case where the application program 201 utilizes a vendor-specific API function 213, the program loads a vendor-specific API providing module 211 into address space 203 of the application program process, as mentioned earlier. Initially, therefore, it is required that the application program 201 specify the module name of the vendor-specific API providing module 211. For example, by calling a GetPrinterDriver function, which is an OS-provided API, the application program 201 can acquire the file names of a user interface module and rendering module from among the modules constituting the printer driver. Owing to the fact that the user interface module or rendering module includes a vendor-specific API function 213, the application program 201 is capable of specifying the module name of the vendor-specific API providing module 211. Further, in a case where a vendor-specific API is provided by a module other than a user interface module or rendering module, it may be so arranged that the module name of the vendor-specific API providing module 211 is specified using an ExtEscape function, described later. After the vendor-specific API providing module 211 is loaded into address space 203 of the application program process, the application program 201 acquires the address of the vendor-specific API function 213 and calls this function.

Figure 3A:
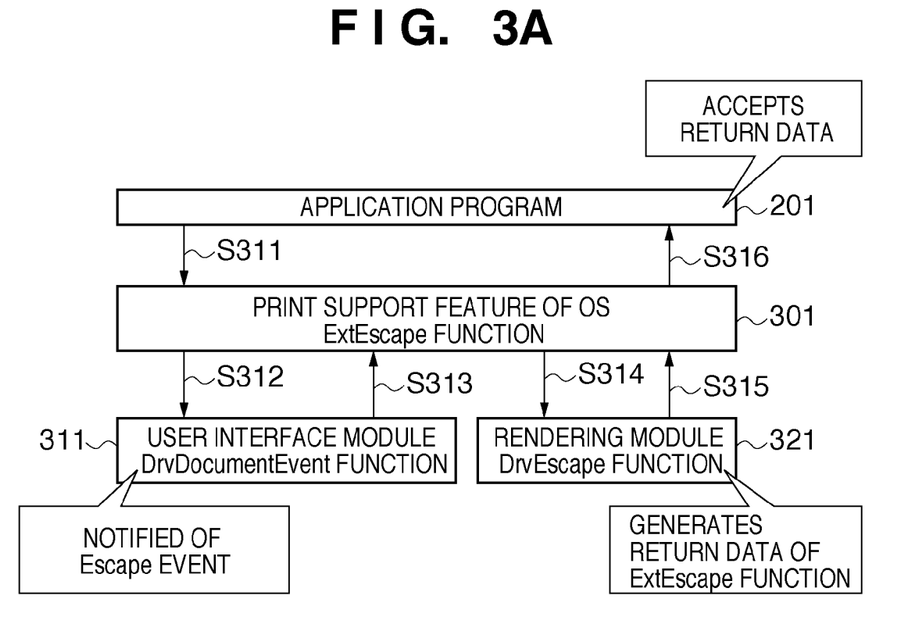
FIG. 3A is a schematic view useful in describing the flow of conventional processing when an application program calls an ExtEscape function.

FIG. 3A is an example of a schematic view illustrating the operation of the ExtEscape function, which is an OS-provided API. By utilizing the ExtEscape function, the application program 201 and printer driver are capable of passing vendor-specific information. A print support feature 301 of the OS is a feature provided by the OS. Through the print support feature 301, the OS executes processing of the API function called by the application program 201 and calls the printer driver as necessary. A user interface module 311 and a rendering module 321 are included in a group of modules constituting the printer driver. The user interface module 311 has a feature for allowing the user to configure various items relating to printing and for creating print settings based upon indications from the user. The rendering module 321 has a feature for converting a rendering instruction of the application program 201, which has been accepted via a GDI, to an image or for converting it to page description language.

The application program 201 designates a vendor-specific Escape code (S311) as the argument of the ExtEscape function in order to obtain the desired vendor-specific information as in the form of a list of amounts of extension in borderless printing, by way of example. At the same time, data necessary for Escape processing, described later, is passed as the argument of the ExtEscape function. When the application program 201 calls the ExtEscape function, the print support feature 301 of the OS calls a DrvDocumentEvent function of the user interface module 311 of the printer driver (S312). The DrvDocumentEvent function is capable of referring to the argument when the ExtEscape function is called by the application program 201. When notification of the Escape event is given and processing of the DrvDocumentEvent function ends (S313), the print support feature 301 allows the OS to call a DrvEscape function (S314) of the rendering module 321 in the printer driver. The DrvEscape function is capable of referring to the argument when the application program 201 calls the ExtEscape function. The DrvEscape function executes processing conforming to the argument and generates return data of the ExtEscape function. Here the return data is arranged to include the vendor-specific information. The return data generated by the DrvEscape function is returned to the application program 201 via the print support feature 301 of the OS (S315 and S316).

In a case where a 32-bit application program in the 32-bit version of Windows or a 64-bit application program in the 64-bit version of Windows has called the ExtEscape function, the printer driver generally operates in a process the same as that of the application program. On the other hand, in a case where the 32-bit application program in the 64-bit version of Windows has called the ExtEscape function, a 64-bit printer driver operates in a 64-bit process that is different from the 32-bit process of the application program.

SUMMARY OF THE INVENTION

However, in a case where vendor-specific information is returned from a printer driver to an application program by the conventional methods, the problems set forth below arise.

Figure 3B:
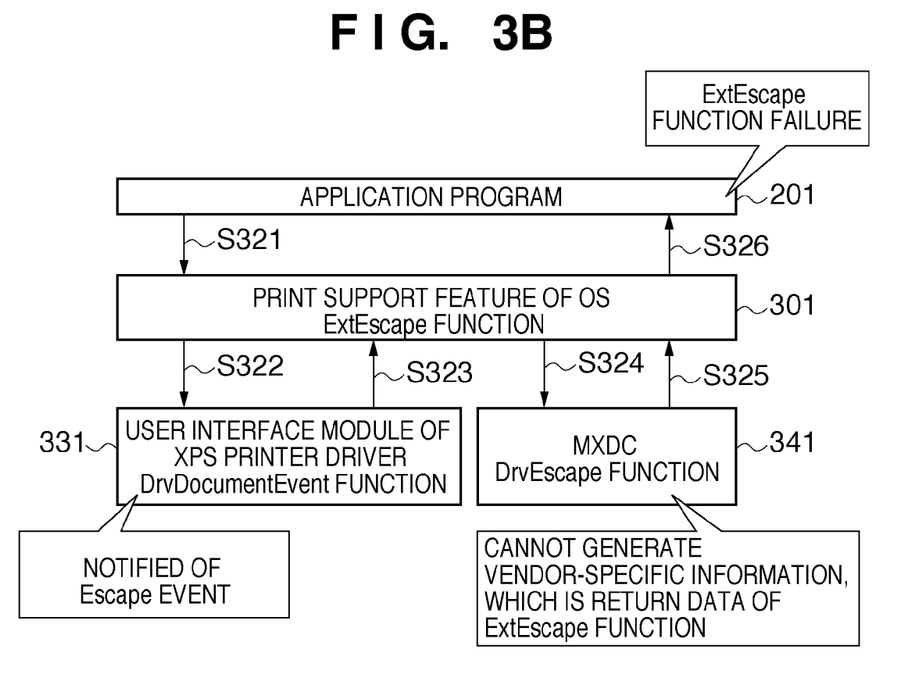
FIG. 3B is a schematic view useful in describing the flow of conventional processing when an application program calls an ExtEscape function.

First, a problem which arises with the XPS printer driver is that return data of the ExtEscape function cannot be generated. FIG. 3B is an example of a schematic view illustrating the operation of the ExtEscape function in an XPS printer driver. The application program 201 designates a vendor-specific Escape code and calls the ExtEscape function in order to acquire vendor-specific information (S321). Initially the print support feature 301 of the OS calls the DrvDocumentEvent function of a user interface module 331 in the XPS printer driver (S322). After notification of the Escape event is given and processing of the interface module 331 ends (S323), the print support feature 301 of the OS calls a DrvEscape function (S324) of an MXDC 341. Since the MXDC 341 has been provided by Microsoft, as described above, the vendor-specific Escape code is processed as an unknown Escape code. Accordingly, since the ExtEscape function cannot generate return data with respect to the vendor-specific code, the problem which arises is that the application program 201 cannot acquire vendor-specific information (S325 and S326).

Next, the problem with a printer driver bundled with the 64-bit version of the Windows product is that a vendor-specific API cannot be supplied to a 32-bit application program. According to the Windows specifications, a 64-bit module cannot be loaded into the address space of the process of a 32-bit application program. With the 64-bit version of Windows, a 64-bit printer driver is required but both a 32-bit application program and a 64-bit application program will operate. Accordingly, in order for a 64-bit printer driver to supply a vendor-specific API to a 32-bit application program that operates on the 64-bit version of Windows, it is required that the modules constituting the 64-bit printer driver include at least one 32-bit module. However, since the printer driver bundled with the 64-bit version of Windows is a 64-bit printer driver, as set forth above, no 32-bit module is included. Accordingly, with the 64-bit printer driver bundled with the 64-bit version of Windows, a problem which arises is that the vendor-specific API cannot be supplied to the 32-bit application program.

In addition, in a case where a printer driver is bundled with the Windows product, a problem which arises is that with the user interface module and rendering module, a vendor-specific API cannot be provided. The reason for this is that the user interface module and rendering module capable of being acquired by a GetPrinterDriver function are modules produced by Microsoft; an another-company-specific API cannot be provided. Furthermore, in a case where an XPS printer driver is bundled with the Windows product, return data of the ExtEscape function cannot be generated, as mentioned above, and therefore the problem which arises is that the application program cannot specify a vendor-specific API providing module.

Accordingly, the present invention has been devised in view of the foregoing problems and provides a method of data communication between an application program and a printer driver which operate in an operating system, wherein the data communication method does not use a vendor-specific API and is not dependent upon a rendering module.

According to one aspect of the present invention, there is provided a method of communicating data between an application program unit and a printer driver unit which operate in an operating system, comprising: a step of the application program unit generating a named object and notifying the printer driver unit of at least name information, which is for accessing the named object, via an API provided by the operating system; a step of the printer driver unit referring to the named object based upon the name information and generating return data from information obtained as well as generation-result information indicating whether generation of the return data succeeded or failed; a step of the printer driver unit storing the return data and the generation-result information in the named object; a step of the application program unit referring to the generation-result information; and a step of the application program unit referring to the return data, which has been stored in the named object, based upon the generation-result information.

In accordance with the present invention, a printer driver stores the vendor-specific information in a named object and an application program refers to the information contained in the named object, whereby the application program is capable of executing processing without a limitation being imposed by the specifications of an OS-provided API.

Furthermore, since the application program utilizes a named shared memory and an ExtEscape function, it is possible for both an event processing unit of a user interface module and an Escape processing unit of a rendering module to store vendor-specific information in the named shared memory. As a result, since processing by the user interface module becomes possible, the vendor-specific information can be returned to the application program even by an XPS printer driver.

Furthermore, by using the named object, vendor-specific information can be returned to the application program even in a case where an application program and printer driver having different operating conditions operate as separate processes.

Furthermore, a printer driver bundled with the 64-bit version of Windows is capable of returning vendor-specific information to a 32-bit application program.

Further, since the printer driver operates only when the application program calls the API, it is unnecessary for a program for providing vendor-specific information to be made to wait as a service or separate process.

Further features of the present invention will become apparent from the following description of exemplary embodiments with reference to the attached drawing.

DESCRIPTION OF THE EMBODIMENTS

The embodiments of the present invention will be described below in detail with reference to the accompanying drawings. It should be noted that the embodiments set forth below do not limit the present invention described in the scope of the claims, and all combinations of features described in the embodiments are not necessarily essential in the present invention.

First Embodiment

Figure 5:
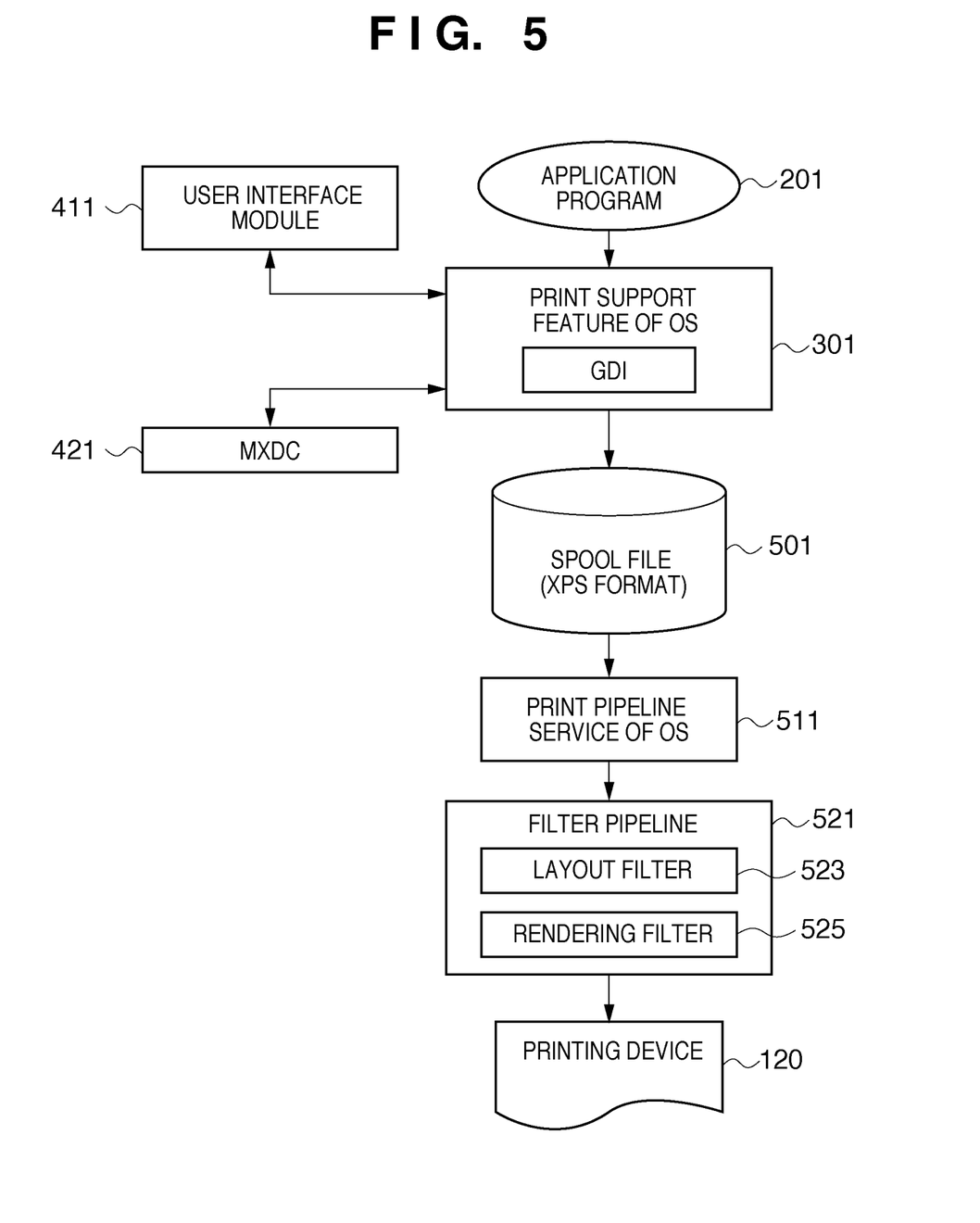
FIG. 5 is a schematic view useful in describing the configuration of an XPS printer driver and a printing operation.

First, reference will be had to FIG. 5 to describe the configuration of an XPS printer driver and a printing operation according to this embodiment. Further, a hardware configuration to which this embodiment is applicable will be described later with reference to FIG. 1.

<Operation of XPS Printer Driver at Time of Printing>

FIG. 5 is a block diagram useful in describing the flow of data in a case where an XPS printer driver has operated when an application program in an operating system executes print processing. The modules constituting the XPS printer driver in FIG. 5 are a user interface module 411, an MSDC 421, a layout filter 523 and a rendering filter 525.

By calling the user interface module 411 from the application program 201 via the print support feature 301 of the OS, the user is allowed to make various settings relating to printing.

If printing is instructed from the application program 201 by user operation, the content of this instruction is sent to the print support feature 301 of the OS. Specifically, DC (Device Context), which is a virtual print area, is created by a GDI and the DC is supplied to the application program 201. Document-data drawing processing is executed with respect to the DC by the application program 201. The drawing content is converted to the XPS format by the MSDC 421, as a result of which XPS-formatted print data is generated. The XPS-formatted print data is spooled temporarily in a storage device as a spool file 501 on a per-job basis by the print support feature 301 of the OS.

The description will be premised on the fact that the application program 201 causes the GDI to perform drawing. In the case of an application program that is capable of creating an XPS-formatted electronic document, on the other hand, it is possible for created XPS-formatted print data to be spooled without relying upon a GDI and MSDC 421.

The data that has been stored in the spool file 501 is supplied to a filter pipeline 521 called by a print pipeline service 511 of the OS. The filter pipeline 521 is composed of any number of filters described in a pipeline configuration file of the XPS printer driver (not shown). In a case where a print command that can be interpreted by a printing device 120 does not exist in the XPS format, at least a filter for converting the spooled XPS-formatted data to a print command in a format that can be interpreted by the printing device is required. In FIG. 5, the filter pipeline 521 is constituted by the layout filter 523 and rendering filter 525. The layout filter 523 acquires the XPS-formatted print data from the spool file and then edits and outputs the print data as necessary based upon the print settings. If there is no need to manipulate the print data, then the acquired print data is output as is. The output of the layout filter 523 is supplied to the rendering filter 525. The rendering filter 525 executes rendering processing of each page in the supplied XPS-formatted print data, makes a conversion to a print command upon executing the required image processing and outputs the print command. The print command that has been output by the rendering filter 525 is supplied to the printing device 120, which proceeds to execute a printing operation.

<Print Settings Dialog>

Figure 6:
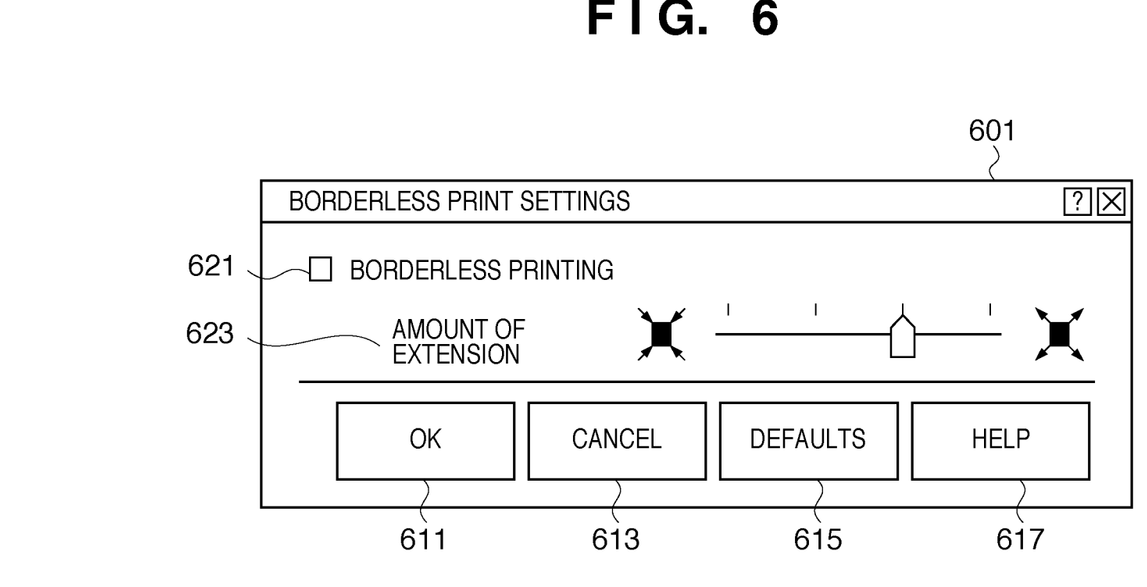
FIG. 6 is an example of display of a borderless settings dialog for configuring printing related to borderless printing.

A print settings dialog which the user interface module 411 provides to the user will be described next. FIG. 6 is a diagram illustrating an example of a print settings dialog displayed when the print settings in this embodiment are made by the user. The print settings dialog displays settings-related content and accepts from the user an instruction and input for changing the settings content. Illustrated as an example in FIG. 6 is a setting relating to extension-amount information in borderless printing, which is information that cannot be acquired with an OS-provided API. Not illustrated here are setting items relating to ordinary information that can be handled by a printer, which information is obtained by the above-mentioned DeviceCapabilities function.

FIG. 6 is an example of display of a borderless settings dialog 601 for configuring printing related to borderless printing. The borderless settings dialog 601 is composed of display areas 611, 613, 615, 617, 621 and 623. In borderless setting section 621, the borderless print feature can be enabled by marking the check box. In a borderless extension amount section 623, the amount of page extension of a print document can be designated when the borderless print feature is in effect since it is required in such case that the page of the print document be printed to a size larger than the size of the paper. Here a four-stage adjustment is possible. From the right, the four stages are large, medium, small and no extension.

By clicking an OK button 611 after each item is selected, the user can close the borderless settings dialog 601 and cause the set print settings to be reflected in printing. If a CANCEL button 613 is clicked, the borderless settings dialog 601 closes and the content of the selected setting items is discarded and is not reflected in printing. If a DEFAULTS button 615 is clicked, the set values of each of the setting items in the borderless settings dialog 601 are restored to the normal values. If a HELP button 617 is clicked, guidance related to the setting items in the borderless settings dialog 601 can be displayed in a separate window.

Thus, the user is capable of configuring printing relating to printer-specific capabilities, and not just ordinary information such as paper size, via a print settings dialog which the user interface module 411 provides to the user.

<Acquisition of Unique Data Using Named Shared Memory and ExtEscape Function>

Described next will be the flow of processing whereby the application program 201 acquires vendor-specific information from the XPS printer driver using the ExtEscape function. The named shared memory will be described first. A named shared memory is one type of file mapping object and is one named object provided by the OS. A feature of a named shared memory is that it is accessible from multiple processes. The multiple processes mentioned here include a 32-bit process and a 64-bit process. This means that the named shared memory is accessible from both the 32-bit and 64-bit processes. For example, even in a case where the process of an application program that calls the ExtEscape function and a process in which the printer driver called from the print support feature of the OS operates do not coincide in terms of the number of bits, access becomes possible from the process of the application by using the named shared memory.

Figure 4:
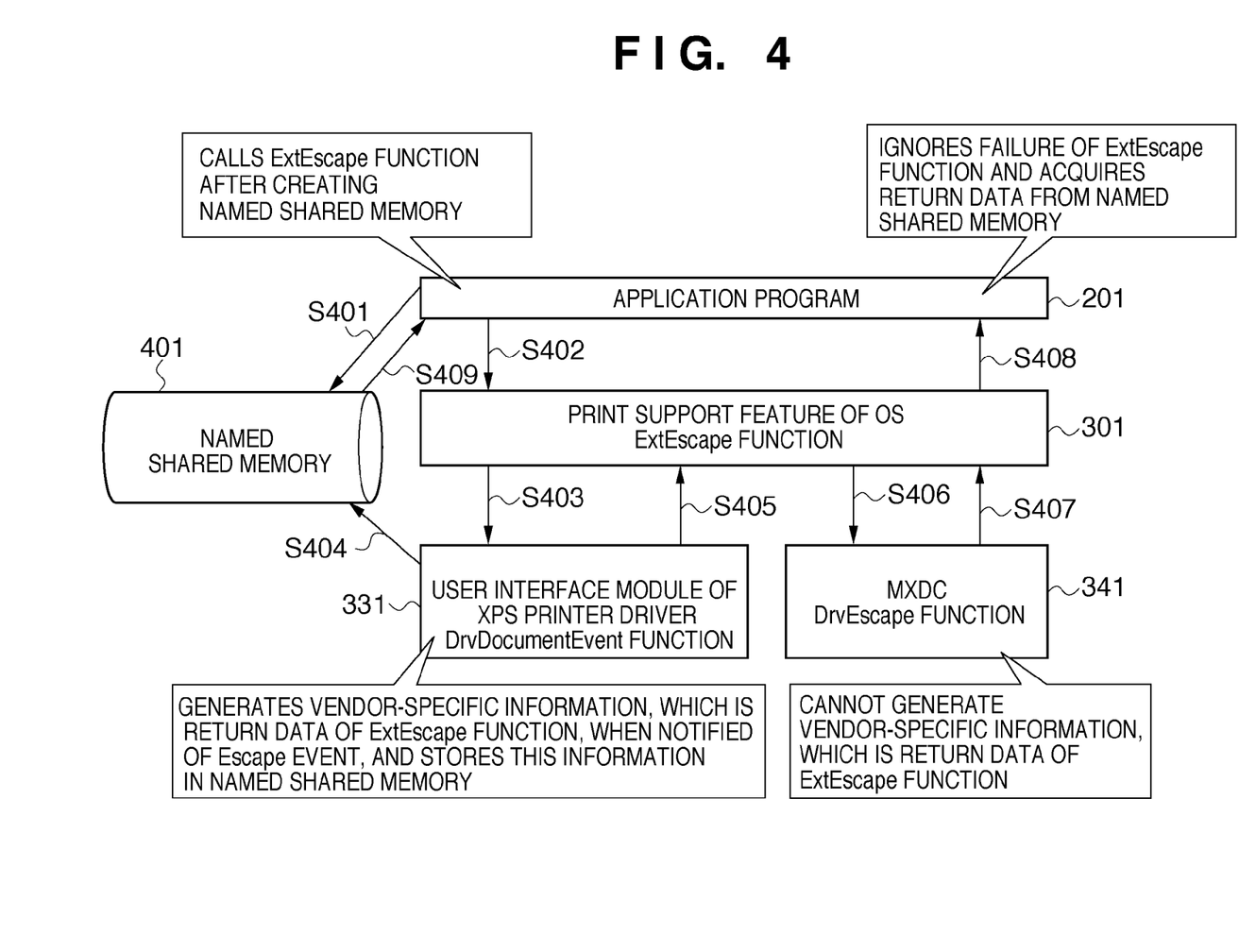
FIG. 4 is a schematic view useful in describing the flow of processing according to the present invention when an application program calls an ExtEscape function.

FIG. 4 is an example of a schematic view illustrating the operation of the ExtEscape function in an XPS printer driver in this embodiment. The application program 201 creates a named shared memory 401 before calling the ExtEscape function and stores the type of vendor-specific information desired to be acquired (e.g., a setting item) (S401). Next, in order to acquire vendor-specific information, the application program 201 calls the ExtEscape function designating the vendor-specific Escape code and the name of the named shared memory 401 that has been created (S402). The print support feature 301 first calls the DrvDocumentEvent function of the user interface module 331 of the XPS printer driver (S403). The user interface module 331 of the XPS printer driver discriminates the vendor-specific Escape code and generates vendor-specific information if the event of the ExtEscape function is indicated. The user interface module 331 of the XPS printer driver stores the generated vendor-specific information in the named shared memory 401 based upon the name information of the named shared memory 401 passed as the argument (S404). After the processing by the user interface module 331 of the XPS printer driver ends (S405), the print support feature 301 calls the DrvEscape function of the MXDC 341 (S406). As mentioned above, the MXDC 341 has been provided by Microsoft and therefore the vendor-specific Escape code is processed as an unknown Escape code. Accordingly, since return data of the vendor-specific ExtEscape function cannot be generated, the application program 201 cannot acquire vendor-specific information (S407 and S408). Since vendor-specific information cannot be acquired by the processing of the ExtEscape function, as mentioned above, the application program 201 ignores the result of processing of the ExtEscape function and acquires vendor-specific information from the named shared memory 401 (S409). Finally, the application program 201 deletes the named shared memory 401.

Figure 7:
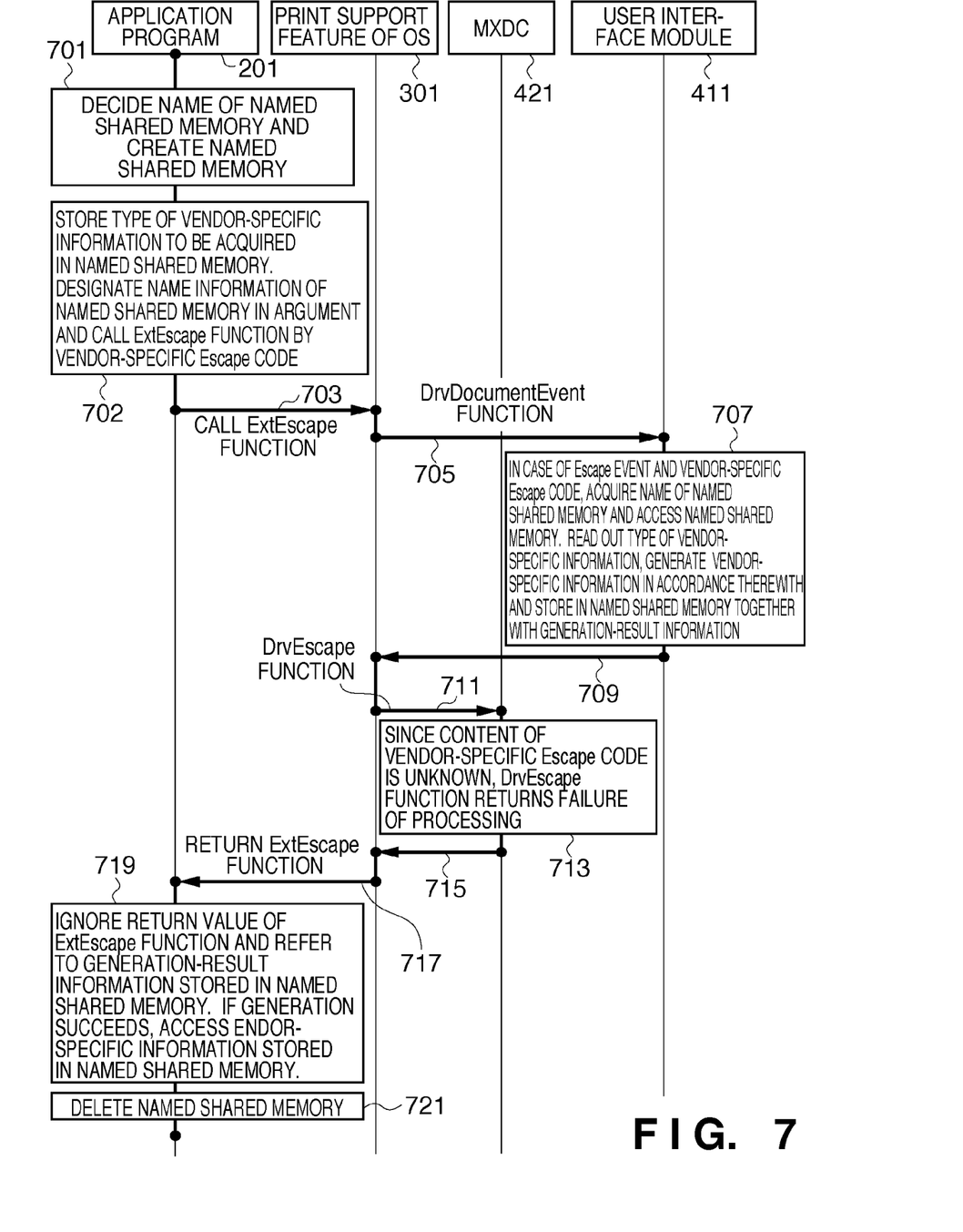
FIG. 7 is a timing chart of acquisition of vendor-specific information and of function invocation using a named shared memory and an ExtEscape function.

FIG. 7 is a timing chart of processing whereby an application program acquires vendor-specific information using a named shared memory and the ExtEscape function. The application program 201 first decides the name of a named shared memory and creates the named shared memory to which the decided name has been assigned (701). Since there is the possibility that a plurality of items of vendor-specific information will be acquired simultaneously within the processes of the application program 201, the name of the named shared memory can be decided utilizing a process ID and thread ID. The application program 201 then executes processing for calling the ExtEscape function (702). First, the application program 201 stores the type of vendor-specific information desired to be acquired in the named shared memory. The application program 201 then designates the name information of the named shared memory in the argument and calls the ExtEscape function of the print support feature 301 of the OS by the vendor-specific Escape code. The print support feature 301 of the OS interprets the ExtEscape function invocation (703) and calls the DrvDocumentEvent function of the user interface module 411 (705).

The user interface module 411 for which the DrvDocumentEvent function has been called executes processing for storing the vendor-specific information in the named shared memory (707). In a case where the event of which notification has been given to the DrvDocumentEvent function is the Escape event and, moreover, the vendor-specific Escape code has been designated, these being the conditions for processing, the named shared memory is accessed based upon the name information of the named shared memory passed as the argument of the ExtEscape function. The user interface module 411 reads out the type of vendor-specific information that has been stored in the named shared memory, generates vendor-specific information conforming to this type and stores this information in the named shared memory. Further, the user interface module 411 stores generation-result information, which indicates whether generation of the vendor-specific information has succeeded or failed, in the named shared memory. The user interface module 411 terminates processing of the DrvDocumentEvent function and notifies the print support feature 301 of the OS of the end of processing (709).

The print support feature 301 of the OS calls the DrvEscape function of the MSDC 421, which is the rendering module, after the processing of the DrvDocumentEvent function in the user interface module 411 ends (711). In a case where the vendor-specific Escape code has been designated, the MSDC 421 for which the DrvEscape function has been called cannot interpret the content of this code (713). Accordingly, the DrvEscape function cannot execute processing and returns a failure result to the print support feature 301 of the OS (715). From the processing result indicative of failure of the DrvEscape function of the MSDC 421, the print support feature 301 of the OS returns a result, indicative of failure of processing by the ExtEscape function, to the application program 201 as a return value (717).

Following the end of processing by the ExtEscape function, the application program 201 acquires vendor-specific information through the following procedure (719): First, since the return value of the ExtEscape function always means processing failure, the application program 201 ignores this return value. The application program 201 then refers to the generation-result information that has been stored in the application program 201. If the user interface module 411 succeeds in generating the vendor-specific information, the application program 201 acquires the vendor-specific information that has been stored the named shared memory. Finally, the application program 201 deletes the named shared memory (721).

Thus, by using the named shared memory and the OS-provided ExtEscape function, the application program 201 is capable of acquiring vendor-specific information from the XPS printer driver. Accordingly, even in an environment in which a 32-bit application program operates using the 64-bit version of Windows, a printer driver that operates in a 64-bit process different from the process of the application program can provide vendor-specific information by using this method.

It should be noted that in a case where multiple types of vendor-specific information are acquired, it goes without saying that it will suffice if the application program 201 repeats the processing steps 702 and 719 a plurality of times as necessary after processing step 701 and finally executes the processing step 721.

It should be noted that although the name information of the named shared memory is passed as the argument of the ExtEscape function, information for generating the name information may just as well be passed as the argument. For example, the name of the named shared memory can be generated using a process ID and thread ID, as mentioned above. Accordingly, the process ID and thread ID may be passed to the argument of the ExtEscape function. In this case, the user interface module 411 generates the name information of the named shared memory using the process ID and thread ID passed as the argument and accesses the named shared memory using this name information.

<Structure of Data Stored in Named Shared Memory>

Figure 8:
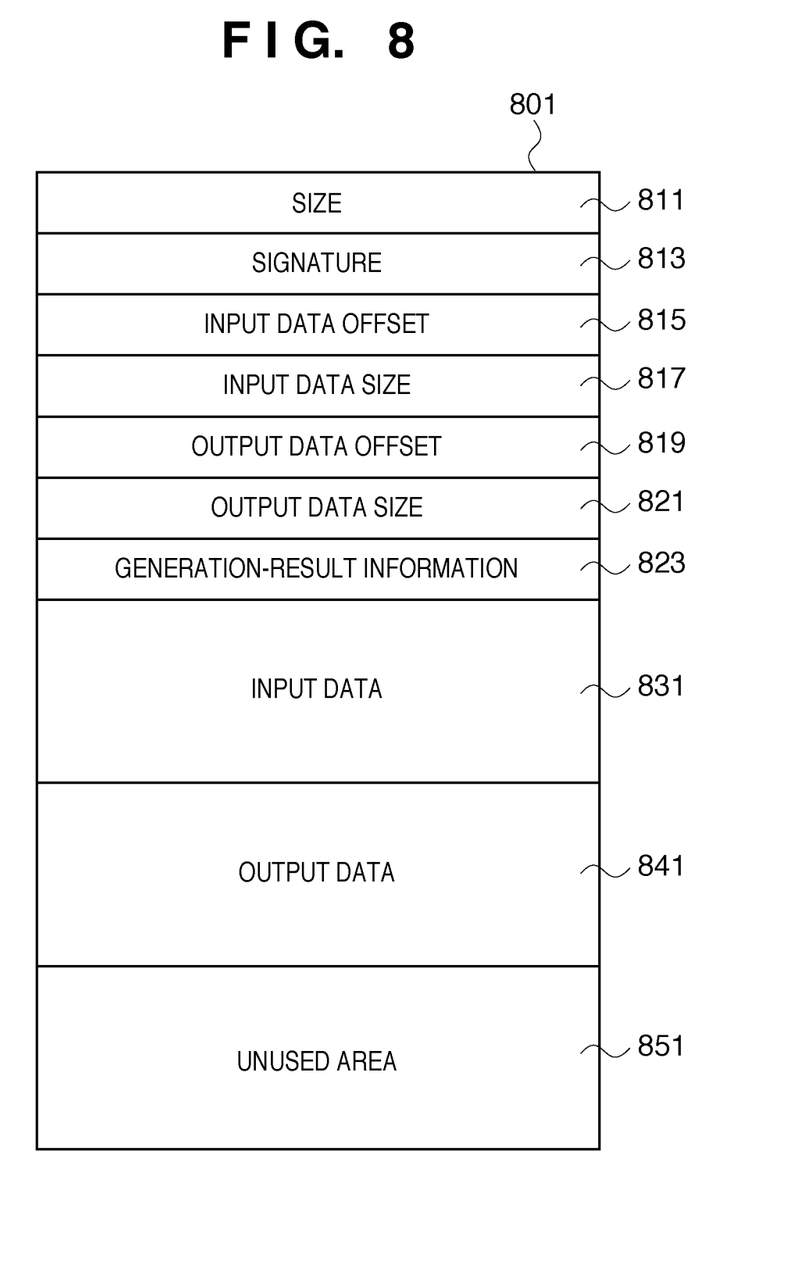
FIG. 8 is a schematic view illustrating the structure of data stored in a named shared memory.

The structure of the data stored in a named shared memory will be described next. FIG. 8 is a diagram illustrating an example of the structure of data stored in a named shared memory in this embodiment. A named shared memory 801 is composed of members 811 to 851.

The member 811 indicates the size of the named shared memory 801. A signature 813 is any value that the user assigns to the named shared memory. Generally an integral value or a short character string is used. The signature 813 may be made a value capable of being identified commonly by both the application program and printer driver. An input data offset 815 is an offset indicating the position of offset data and is represented by the number of bytes, etc., from the beginning of the named shared memory 801. Input data size 817 is the size of the input data. Here the size of input data 831, described later, is represented by the number of bytes, etc. An output data offset 819 is an offset indicating the position of output data and is represented by the number of bytes, etc., from the beginning of the named shared memory 801. Output data size 821 is the size of the output data. Here the size of output data 841, described later, is represented by the number of bytes, etc.

Generation-result information 823 contains information indicting whether the user interface module 411 succeeded in generating the vendor-specific information. The application program 201 refers to this information and discriminates the vendor-specific information generation. The input data 831 contains data which the application program 201 delivers to the printer driver. The input data 831 may request only a single item in the vendor-specific information, or data that subdivides the content of a setting item and requests a plurality of setting items may be adopted as the input data. For example, in the case of a plurality of setting items, data that collectively requests a list of extension-amount setting values in borderless printing as the type of vendor-specific information may be adopted as the input data.

The output data 841 contains vendor-specific information that has been generated by the 411. For example, the output data 841 contains a list of extension-amount setting values in borderless printing conforming to the print settings information. Here the content of member 841 may be subdivided in accordance with the input content of the input data 831 and a plurality of setting items may be adopted as output data. For example, the output data 841 may contain a list of extension-amount setting values in borderless printing conforming to the feature as well as the number of elements included in the list. It should be noted that the data included in the input data 831 and output data 841 is not limited to the data mentioned and may be any data so long as it is data that is to be communicated between the application program and the user interface module. The member 851 is an unused area of the named shared memory 801.

<Processing for Acquiring Vendor-Specific Information of Application Program>

Next, processing by which the application program acquires vendor-specific information will be described.

Figure 9:
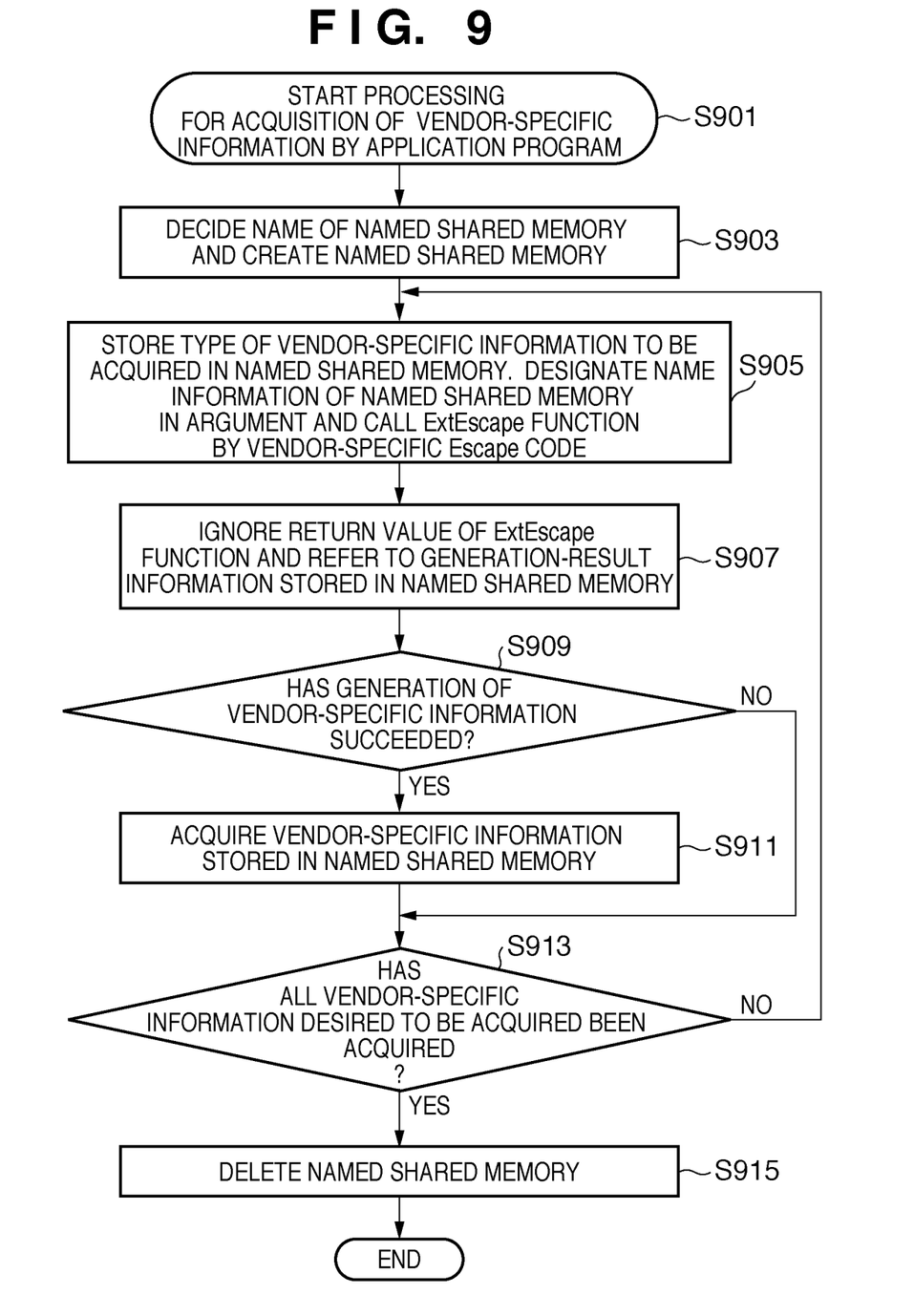
FIG. 9 is a flowchart of processing by which an application program acquires vendor-specific information.

FIG. 9 is an example of a flowchart of processing by which an application program acquires vendor-specific information. Processing starts at step S901. Next, the application program decides the name of a named shared memory and creates the named shared memory (step S903). Next, at step S905, the application program stores the type of vendor-specific information to be acquired in the named shared memory. The application program designates the name information of the named shared memory as an argument and calls the ExtEscape function by the vendor-specific Escape code. Then, at step S907, the application program ignores the return data of the ExtEscape function and refers to the generation-result information 823 that has been stored in the named shared memory. Next, at step S909, the application program determines from the generation-result information 823 whether generation of the vendor-specific information succeeded. Control proceeds to step S911 if generation succeeded and to step S913 if generation failed. At step S911, the application program acquires the vendor-specific information that has been stored in the named shared memory 801. At step S913, it is determined whether all of the vendor-specific information desired to be acquired by the application program has been acquired. Control proceeds to step S915 if all of the information has been acquired and to step S905 if it has not. At step S915, the application program deletes the named shared memory created at step S903 and finally terminates processing at step S916.

<Processing of DrvDocumentEvent Function>

Figure 10:
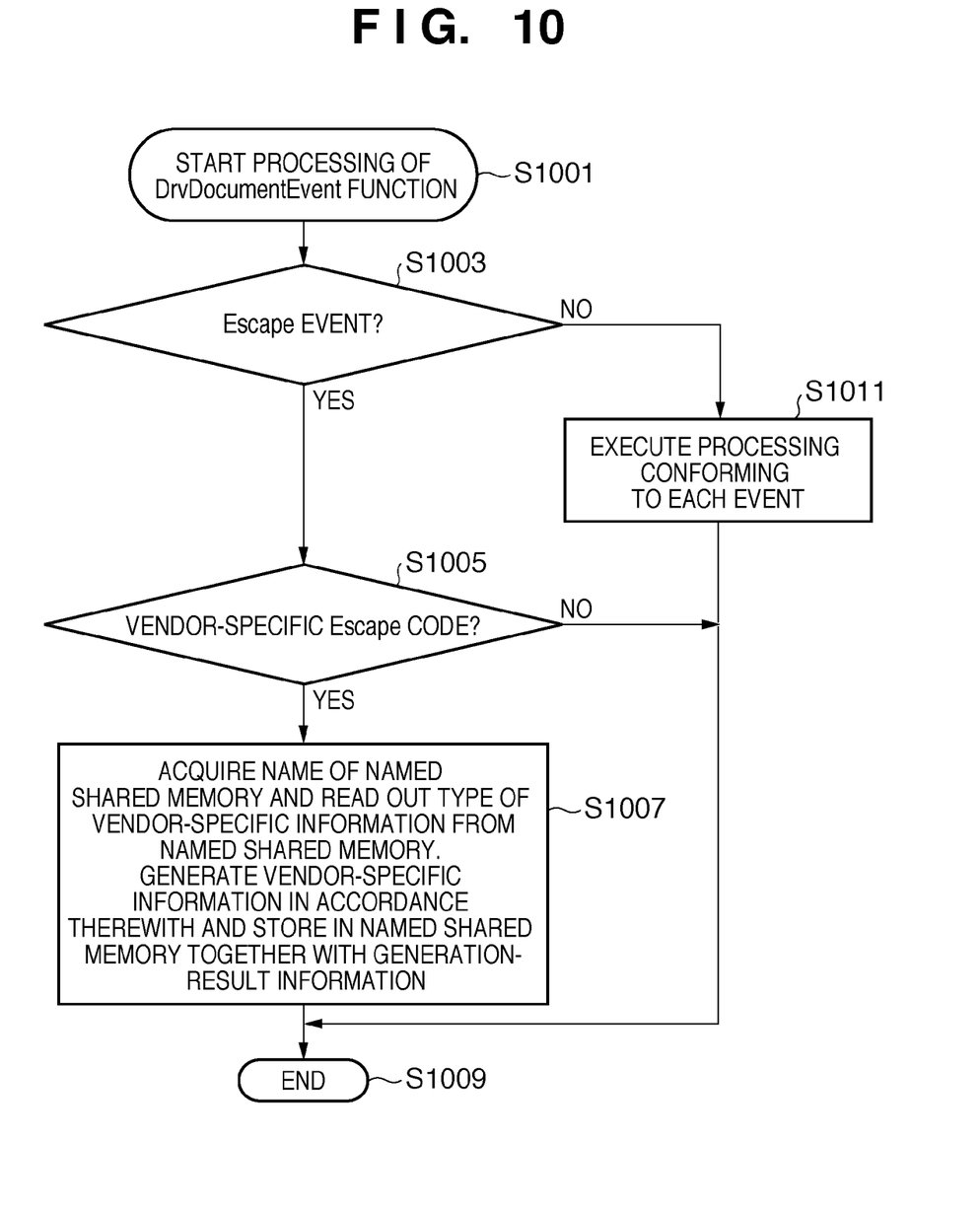
FIG. 10 is a flowchart of processing of a DrvDocumentEvent function.

Described next will be processing of the DrvDocumentEvent function of the user interface module. FIG. 10 is an example of a flowchart of processing of the DrvDocumentEvent function.

Processing starts at step S1001. Next, at step S1003, the user interface module determines whether the type of event of which it has been notified is the Escape event. Control proceeds to step S1005 if the event is the Escape event and to step S1011 if the event is not the Escape event. At step S1005, the user interface module determines whether the Escape code passed as the Escape event is the vendor-specific Escape code. Control proceeds to step S1007 if the code is the vendor-specific Escape code and to step S1109 if it is not. At step S1007, the user interface module acquires the name information of the named shared memory passed from the ExtEscape function by the argument and refers to the type of vendor-specific information from the named shared memory. The user interface module generates the vendor-specific information in accordance with the type and stores the information in the named shared memory together with the generation-result information indicating whether generation of the vendor-specific information succeeded or failed. At step S1011, the user interface module executes processing in accordance with various events other than the Escape event of which notification has been given. Control then proceeds to step S1009. The various events at step S1011 and the content processing conforming to the events have no relation to the present invention and need not be described in detail. The user interface module finally terminates processing at step S1009.

<Example of Configuration of Printing System>

Figure 1:
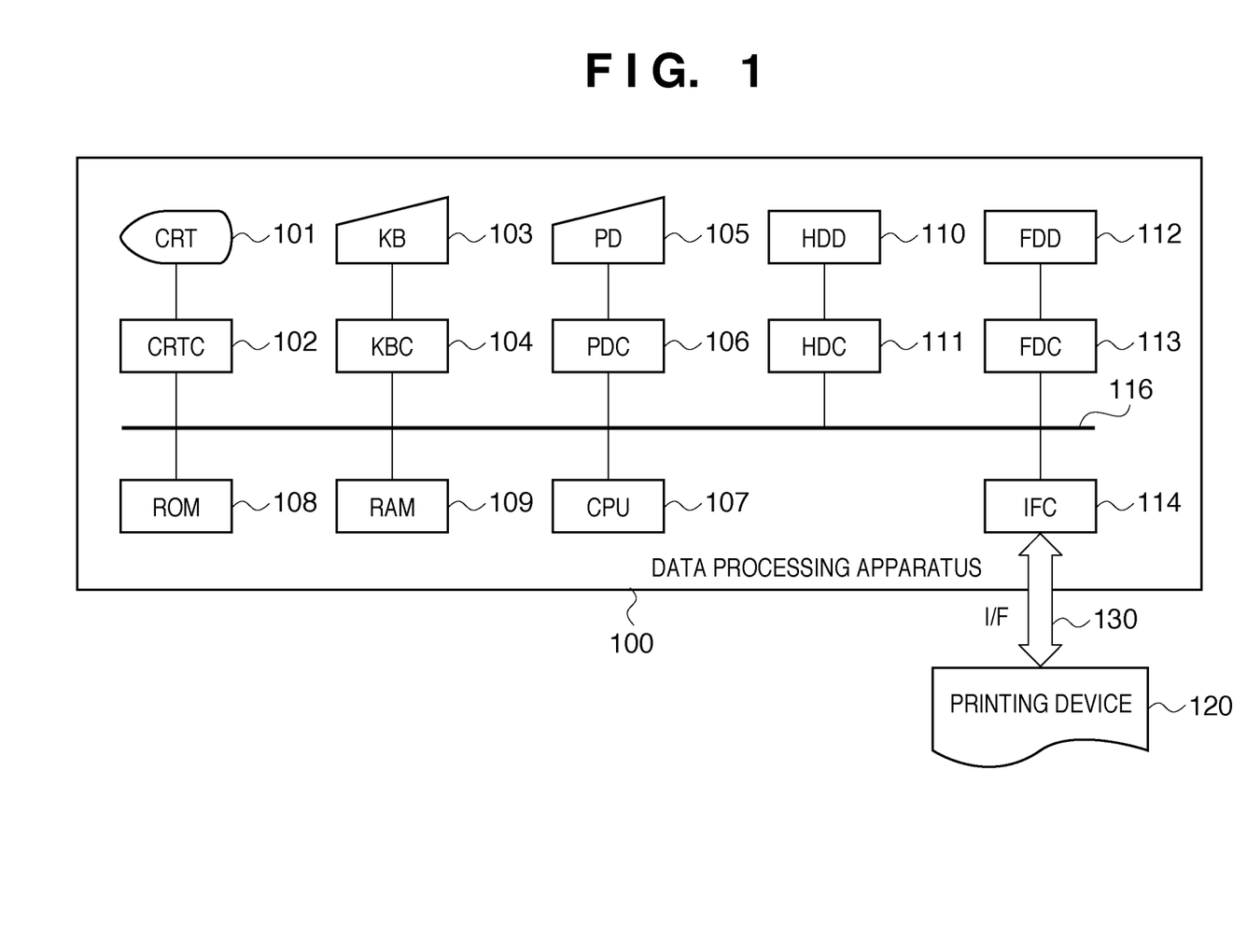
FIG. 1 is a block diagram illustrating the configuration of a printing system.

A printing system to which this embodiment is applicable will be described next with reference to FIG. 1. FIG. 1 is an example of a block diagram illustrating the configuration of a printing system in this embodiment. Broadly speaking, the printing system in this embodiment comprises a printing device 120 and a data processing apparatus 100. The data processing apparatus 100 comprises blocks 101 to 114. Although the data processing apparatus is assumed to be a personal computer or the like, it may be any type of equipment so long as this embodiment can be implemented. The equipment should have an OS environment in which an application program and printer driver are capable of operating.

A CRT display device 101 displays a print settings dialog provided by the user interface module of the printer driver. A controller (CRTC) 102 is for controlling the display device. Block 103 is a data input unit such as unit such as a keyboard, block 104 a keyboard controller, block 105 a coordinate input unit such as a pointing device, block 106 a pointing-device controller, block 107 a CPU for controlling the overall apparatus, block 108 a ROM storing a boot program, etc., and block 109 a RAM utilized as a storage location for application programs and a printer driver program relating to the flowchart of this embodiment, and as a work area. Block 110 is a hard-disk drive storing the OS, application programs, the printer driver program relating to the flowchart of this embodiment, font data and data files, etc. Block 111 is a hard-disk controller. A spool file is also stored in the hard-disk drive 110 temporarily. Block 112 is a floppy (registered trademark) disk drive serving as a device for driving a portable storage medium, and block 113 is a floppy (registered trademark) disk controller.

Also provided are an interface 130 and an interface controller 114. The data processing apparatus 100 is connected to the printing device 120, such as an ink-jet printer, via an interface cable. A system bus 116 connects the blocks mentioned above. When power is introduced to the apparatus, the CPU 107 is started up by the boot program stored in the ROM 108, loads the OS from the hard-disk drive 110 and then waits for the operator to perform an operation. In a case where a print command or a command to change the print settings of the printer driver is received from the operator via the keyboard 103 or pointing device 105, or in a case where the system has been configured to start up automatically, the printer driver program that has been stored on the hard-disk drive 110 is loaded to the RAM 109 and executed by the CPU 107.

In the above embodiment, an example in which both input data and output data are stored using a single named shared memory is illustrated. However, it goes without saying that it may be so arranged that the data may be partitioned and stored in a plurality of named shared memories.

In the above embodiment, an example in which a named shared memory is used in order to store input and output data is illustrated. However, it goes without saying that another named object may be used instead. An example of a method that can be mentioned stores input and output data utilizing a file instead of a named shared memory and communicates the name of the file from the application program to the printer driver via an OS-provided API.

Further, in the above embodiment, an example in which the name of the named shared memory is communicated from the application program to the printer driver via an OS-provided API is illustrated. However, it goes without saying that information for accessing the named shared memory may be delivered and not the name information. For example, it may be so arranged that notification is given of information for generating name information utilized in order to access the named shared memory. Specifically, if name information is generated from a process ID and thread ID, then a method available is to notify of the process ID and thread ID upon making the name-information generating rule agree between the application program and printer driver.

Further, if, in a case where another named object is used instead of a named shared memory, the handle of the named object can be shared by multiple processes in common, then it will suffice if the handle is delivered as information for accessing the named object.

In the above embodiment, an example in which the ExtEscape function is used as the OS-provided API is illustrated. However, the invention is not limited to this arrangement and it goes without saying that it will suffice if the API is one called by a module, which constitutes the printer driver, via the print support feature of the OS. For example, it goes without saying that areas for acquiring name information of a named shared memory and vendor-specific information may be added to a private area, etc., of the DEVMODE structure that stores the print settings information, and a Document-Properties function or DeviceCapabilities function may be used.

Effects of this Embodiment

By adopting the arrangement described above, a printer driver stores vendor-specific information in a named object and an application program refers to the information that has been stored in the named object by the printer driver, whereby the application program is capable of executing processing without a limitation being imposed by the specifications of an OS-provided API. Further, since the printer driver operates only when the application program calls the API, it is unnecessary for another program for providing vendor-specific information to be made to wait as a service or separate process.

Furthermore, since the application program utilizes a named shared memory and an ExtEscape function, it is possible for both an event processing unit of a user interface module in a print module and an Escape processing unit of a rendering module to store vendor-specific information in the named shared memory. Since processing by the user interface module becomes possible, the vendor-specific information can be returned to the application program even by an XPS printer driver.

Furthermore, by using the named object, vendor-specific information can be returned to the application program even in a case where an application program and printer driver having different operating conditions operate as separate processes. Of course, application is possible even in a case where an application program and printer driver operate as identical processes.

Furthermore, a printer driver bundled with the 64-bit version of Windows is capable of returning vendor-specific information to a 32-bit application program.

Thus, a data communication method which does not use a vendor-specific API and is not dependent upon a rendering module is possible.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-316274, filed Dec. 11, 2008, which is hereby incorporated by reference herein in its entirety.

What is claimed is:

1. An information processing apparatus that executes an application that runs with a first bit number, and a printer driver that runs with a second bit number, wherein the application comprises:
an allocation unit configured to allocate a named shared memory that can be accessed by both the application and the printer driver; and
a notification unit configured to notify the printer driver of a name of the named shared memory;
wherein the printer driver comprises:
a storing unit configured to store information about a print setting in the named shared memory based on the name of the named shared memory;
wherein the application further comprises:
an acquisition unit configured to acquire the information from the named shared memory, and
wherein the name of the named shared memory is decided by utilizing a process ID and thread ID.

2. The information processing apparatus according to claim 1, wherein
in a case where the application calls a function, the storing unit stores the information in the named shared memory, and
in a case where the application receives a return of the function, the acquisition unit acquires the information stored by the storing unit from the named shared memory.

3. The information processing apparatus according to claim 1, wherein the storing unit stores, in the named shared memory, the information that cannot be acquired by an application programming interface provided by an operating system.

4. The information processing apparatus according to claim 1, wherein
the storing unit stores, in the named shared memory, the information about the print setting and generation-result information indicating whether generation of the information has succeeded or failed, and
in a case where the generation-result information stored by the storing unit indicates that the generation of the information has succeeded, the acquisition unit acquires, from the named shared memory, the information about the print setting stored by the storing unit.

5. The information processing apparatus according to claim 3, wherein the information that cannot be acquired by the application programming interface provided by the operating system is extension-amount in borderless printing.

6. The information processing apparatus according to claim 1, wherein in a case where the printer driver is called by a specific function and a specific code is designated, the storing unit stores the information about the print setting in the named shared memory.

7. An information processing apparatus that executes an application that runs with a first bit number,
wherein the application comprises:
an allocation unit configured to allocate a named shared memory that can be accessed by both the application and a printer driver that runs with a second bit number;
a notification unit configured to notify the printer driver of a name of the named shared memory; and
an acquisition unit configured to acquire information about a print setting stored by the printer driver from the named shared memory,
wherein the name of the named shared memory is decided by utilizing a process ID and thread ID.

8. An information processing apparatus that executes a printer driver that runs with a second bit number,
wherein the printer driver comprises:
a receiving unit configured to receive, from an application that runs with a first bit number, a name of a named shared memory that can be accessed by both the application and the printer driver, and is allocated by the application; and
a storing unit configured to store, in a named shared memory, information about a print setting that is acquired by the application based on the name of the named shared memory,
wherein the name of the named shared memory is decided by utilizing a process ID and thread ID.

9. An information processing method comprising:
executing an application that runs with a first bit number, and a printer driver that runs with a second bit number;
allocating a named shared memory that can be accessed by both the application and the printer driver;
notifying the printer driver of a name of the named shared memory;
storing information about a print setting in the named shared memory based on the name of the named shared memory; and
acquiring the information from the named shared memory,
wherein the storing is executed by the printer driver, and
wherein the allocating, notifying, and acquiring are executed by the application, and
wherein the name of the named shared memory is decided by utilizing a process ID and thread ID.

10. The information processing method according to claim 9, wherein
in a case where the application calls a function, the storing stores the information in the named shared memory, and
in a case where the application receives a return of the function, the acquiring acquires the information stored in the storing from the named shared memory.

11. The information processing method according to claim 9, wherein the storing stores, in the named shared memory, the information that cannot be acquired by an application programming interface provided by an operating system.

12. The information processing method according to claim 9, wherein
the storing stores, in the named shared memory, the information about the print setting and generation-result information indicating whether generation of the information has succeeded or failed, and
in a case where the generation-result information stored by the storing indicates that the generation of the information has succeeded, the acquiring acquires, from the named shared memory, the information about the print setting stored by the storing.

13. The information processing method according to claim 11, wherein the information that cannot be acquired by the application programming interface provided by the operating system is extension-amount in borderless printing.

14. The information processing method according to claim 9, wherein in a case where the printer driver is called by a specific function and a specific code is designated, the information is stored in the named shared memory in the storing.

15. The information processing method according to claim 9, wherein the printer driver displays a print setting dialog for performing a print setting that cannot be acquired by an application programming interface provided by an operating system.

16. An information processing method comprising:
executing an application that runs with a first bit number;
allocating a named shared memory that can be accessed by both the application and a printer driver that runs with a second bit number;
notifying the printer driver of a name of the named shared memory; and
acquiring information about a print setting stored by the printer driver from the named shared memory,
wherein the allocating, notifying, and acquiring are executed by the application, and
wherein the name of the named shared memory is decided by utilizing a process ID and thread ID.

17. An information processing method comprising:
executing a printer driver that runs with a second bit number,
receiving, from an application that runs with a first bit number, a name of a named shared memory that can be accessed by both the application and the printer driver, and is allocated by the application; and
storing, in a named shared memory, information about a print setting that is acquired by the application based on the name of the named shared memory,
wherein the receiving and storing are executed by the printer driver, and
wherein the name of the named shared memory is decided by utilizing a process ID and thread ID.

18. A non-transitory computer-readable medium storing instructions which, when executed by a computer, perform an information processing method comprising:
executing an application that runs with a first bit number, and a printer driver that runs with a second bit number;
allocating a named shared memory that can be accessed by both the application and the printer driver;
notifying the printer driver of a name of the named shared memory;
storing information about a print setting in the named shared memory based on the name of the named shared memory; and
acquiring the information stored in the storing from the named shared memory,
wherein the storing is executed by the printer driver, and
wherein the allocating, notifying, and acquiring are executed by the application, and
wherein the name of the named shared memory is decided by utilizing a process ID and thread ID.

19. The non-transitory computer-readable medium according to claim 18, wherein, in the method,
in a case where the application calls a function, the storing stores the information in the named shared memory, and in a case where the application receives a return of the function, the acquiring acquires the information stored in the storing from the named shared memory.

20. The non-transitory computer-readable medium according to claim 18, wherein the storing stores, in the named shared memory, the information that cannot be acquired by an application programming interface provided by an operating system.

21. The non-transitory computer-readable medium according to claim 18, wherein
the storing stores, in the named shared memory, the information about the print setting and generation-result information indicating whether generation of the information has succeeded or failed, and
in a case where the generation-result information stored by the storing indicates that the generation of the information has succeeded, the acquiring acquires, from the named shared memory, the information about the print setting stored in the storing.

22. The non-transitory computer-readable medium according to claim 20, wherein the information that cannot be acquired by the application programming interface provided by the operating system is extension amount in borderless printing.

23. The non-transitory computer-readable medium according to claim 18, wherein in a case where the printer driver is called by a specific function and a specific code is designated, the information about the print setting is stored in the named shared memory in the storing.

24. A non-transitory computer-readable medium storing instructions which, when executed by a computer, perform an information processing method comprising:

executing an application that runs with a first bit number;
allocating a named shared memory that can be accessed by both the application and a printer driver that runs with a second bit number;
notifying the printer driver of a name of the named shared memory; and
acquiring information about a print setting stored by the printer driver from the named shared memory,
wherein the allocating, notifying, and acquiring is executed by the application, and
wherein the name of the named shared memory is decided by utilizing a process ID and thread ID.

25. A non-transitory computer-readable medium storing instructions which, when executed by a computer, perform an information processing method comprising:

executing a printer driver that runs with a second bit number,
receiving, from an application that runs with a first bit number, a name of a named shared memory that can be accessed by both the application and the printer driver, and is allocated by the application; and
storing, in a named shared memory, information about a print setting that is acquired by the application based on the name of the named shared memory
wherein the receiving and storing is executed by the printer driver, and
wherein the name of the named shared memory is decided by utilizing a process ID and thread ID.

* * * * *